US011044794B2

(12) United States Patent
Lark, Jr.

(10) Patent No.: US 11,044,794 B2
(45) Date of Patent: Jun. 22, 2021

(54) INTELLIGENT LIGHTING CONTROL SYSTEM ZONE IDENTIFICATION APPARATUSES, SYSTEMS, AND METHODS

(71) Applicant: Racepoint Energy, LLC, Osterville, MA (US)

(72) Inventor: William Lark, Jr., Glendale, CA (US)

(73) Assignee: Racepoint Energy, LLC, Osterville, MA (US)

( * ) Notice: Subject to any disclaimer, the term of this patent is extended or adjusted under 35 U.S.C. 154(b) by 229 days.

(21) Appl. No.: 16/316,118

(22) PCT Filed: Jul. 7, 2017

(86) PCT No.: PCT/US2017/041198
§ 371 (c)(1),
(2) Date: Jan. 8, 2019

(87) PCT Pub. No.: WO2018/009866
PCT Pub. Date: Jan. 11, 2018

(65) Prior Publication Data
US 2020/0288557 A1    Sep. 10, 2020

Related U.S. Application Data

(60) Provisional application No. 62/360,308, filed on Jul. 8, 2016.

(51) Int. Cl.
*H05B 47/105*    (2020.01)
*H05B 47/11*    (2020.01)
(Continued)

(52) U.S. Cl.
CPC .......... *H05B 47/105* (2020.01); *H05B 45/20* (2020.01); *H05B 47/11* (2020.01); *H05B 47/19* (2020.01); *H05B 47/22* (2020.01); *Y02B 20/40* (2013.01)

(58) Field of Classification Search
CPC ...... H05B 47/105; H05B 47/11; H05B 47/22; H05B 47/19; H05B 45/20; Y02B 20/40
See application file for complete search history.

(56) References Cited

U.S. PATENT DOCUMENTS 8,232,745 B2    7/2012 Chemel et al.
9,967,959 B2 *   5/2018 Lim Chi Cheung .. H05B 47/19
(Continued)

OTHER PUBLICATIONS

International Search Report and Written Opinion for App. Ser. No. PCT/US17/41198, dated Sep. 22, 2017, 8 pages.
(Continued)

*Primary Examiner* — Raymond R Chai
(74) *Attorney, Agent, or Firm* — Cesari and McKenna, LLP

(57) ABSTRACT

The present disclosure provides an intelligent lighting control system. A first switch control circuit of a first lighting control module of a plurality of lighting control modules is actuated. The actuation is detected at each lighting control module in the plurality of lighting control modules. The light sensor in each lighting control module are polled by the respective processor in each lighting control module, to detect a change in a light level. The change in the light level detected by the respective lighting control module is transmitting, from each lighting control module. The lighting control modules that detected the change in the light level are catalogued into a 1st zone of one or more zones.

20 Claims, 17 Drawing Sheets

(51) Int. Cl.
*H05B 47/19* (2020.01)
*H05B 47/21* (2020.01)
*H05B 45/20* (2020.01)

(56) References Cited

U.S. PATENT DOCUMENTS

| | | | |
|---|---|---|---|
| 10,206,267 B2* | 2/2019 | Yau .................... | G05D 25/02 |
| 2005/0037815 A1* | 2/2005 | Besharat ............... | G09G 5/02 |
| | | | 455/566 |
| 2005/0289279 A1* | 12/2005 | Fails .................... | H05B 47/18 |
| | | | 710/315 |
| 2006/0132065 A1 | 6/2006 | Sears et al. | |
| 2009/0278479 A1 | 11/2009 | Platner et al. | |
| 2011/0178650 A1* | 7/2011 | Picco ................... | H05B 47/18 |
| | | | 700/295 |
| 2013/0063042 A1* | 3/2013 | Bora .................... | H05B 47/16 |
| | | | 315/292 |
| 2015/0035437 A1* | 2/2015 | Panopoulos .......... | F21V 14/02 |
| | | | 315/112 |
| 2015/0327348 A1* | 11/2015 | Dau .................... | H05B 45/50 |
| | | | 315/153 |

OTHER PUBLICATIONS

International Preliminary Report on Patentability for App. No. PCT/US2017/41198, dated Jan. 8, 2019, 6 pages.

* cited by examiner

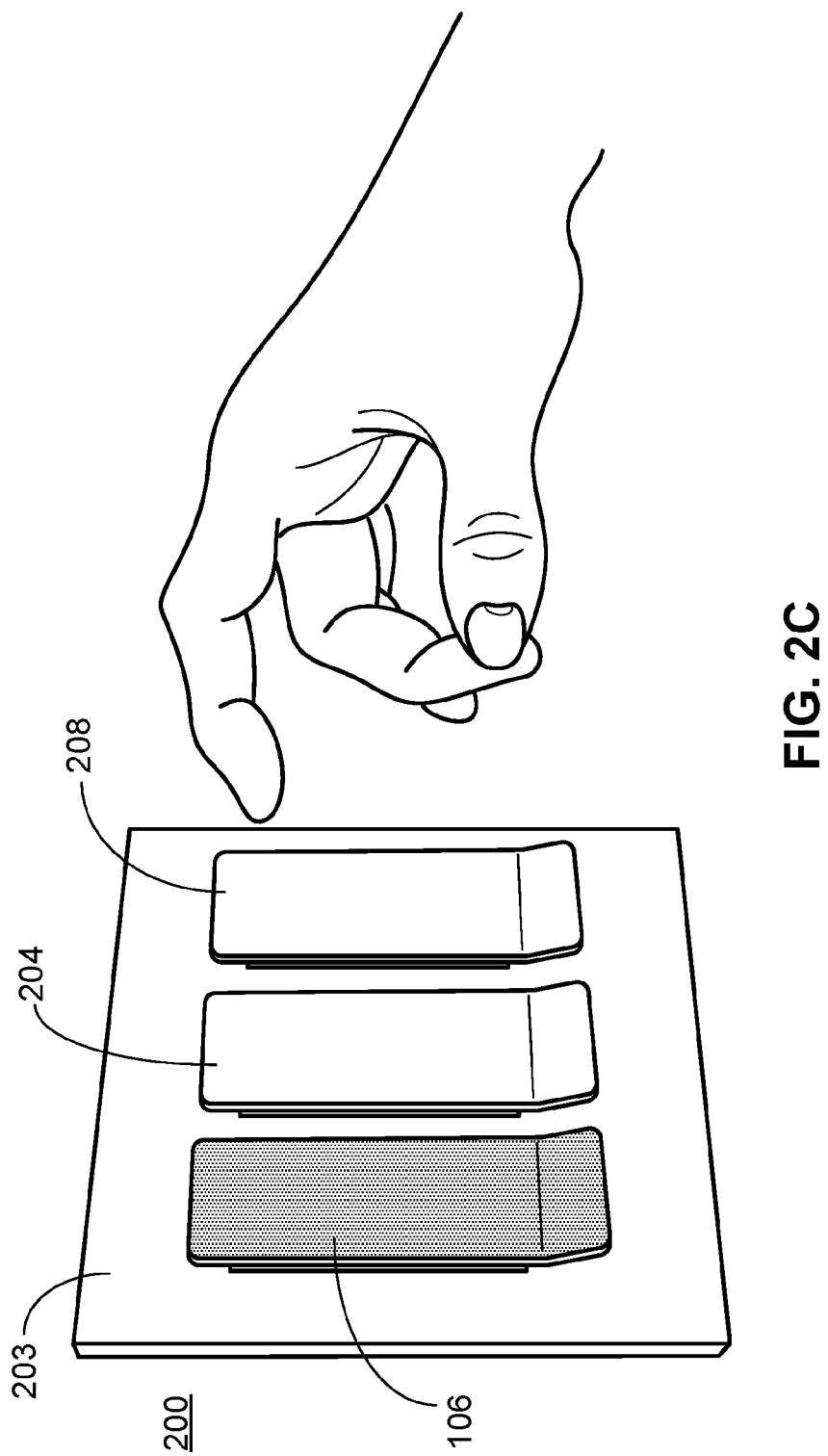

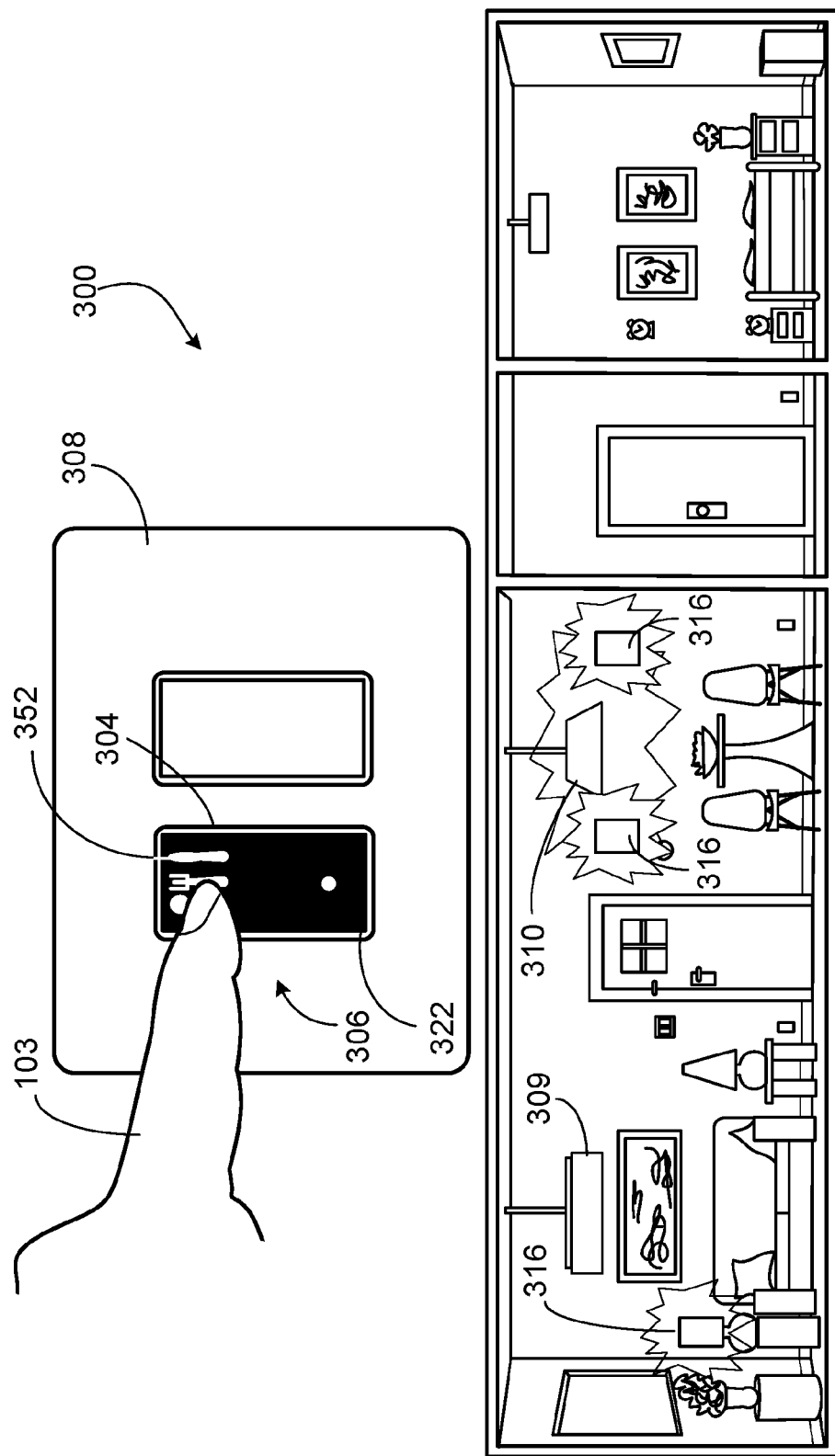

SYSTEM ZONE IDENTIFICATION

GIVEN #1: AT FIRST SETUP, EACH SWITCH IS UNAWARE OF ITS LOCATION RELATIVE TO EACH OTHER

GIVEN #2: SWITCHES DIRECTLY CONTROL GROUPS OF LIGHTS

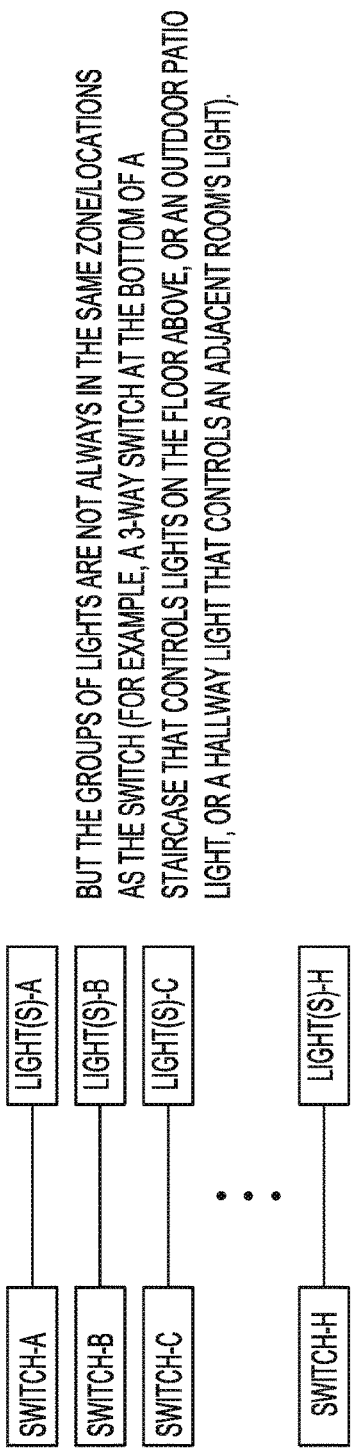

BUT THE GROUPS OF LIGHTS ARE NOT ALWAYS IN THE SAME ZONE/LOCATIONS AS THE SWITCH (FOR EXAMPLE, A 3-WAY SWITCH AT THE BOTTOM OF A STAIRCASE THAT CONTROLS LIGHTS ON THE FLOOR ABOVE, OR AN OUTDOOR PATIO LIGHT, OR A HALLWAY LIGHT THAT CONTROLS AN ADJACENT ROOM'S LIGHT).

EXAMPLE SCENARIO #1: AFTER RUNNING THE ZONE IDENTIFICATION SEQUENCE, THE LOGIC FROM THE LIGHT SENSOR READINGS MAY REVEAL THE FOLLOWING:

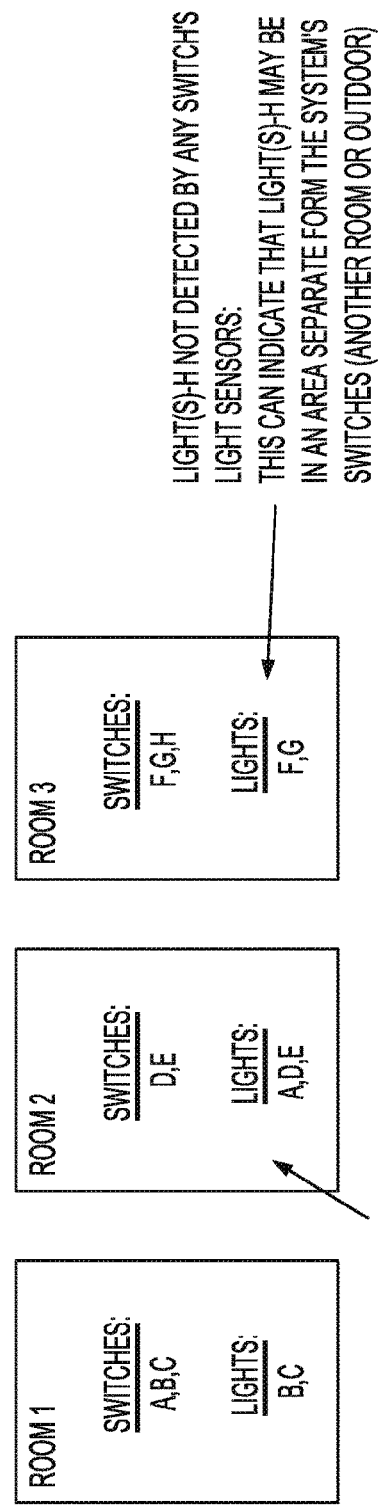

LIGHT(S)-H NOT DETECTED BY ANY SWITCH'S LIGHT SENSORS:

THIS CAN INDICATE THAT LIGHT(S)-H MAY BE IN AN AREA SEPARATE FORM THE SYSTEM'S SWITCHES (ANOTHER ROOM OR OUTDOOR)

IF THE SWITCH'S LIGHT SENSORS IN THE ROOM IDENTICAL MEASUREMENTS FROM TWO DIFFERENT ACTIVATIONS, THIS MAY INDICATE A 3-WAY CONFIGURATION IN THE ROOM. LOAD MEASUREMENT BY EACH SUSPECTED 3-WAY SWITCH CAN VERIFY THE COUPLING.

FIG. 9

INTELLIGENT LIGHTING CONTROL SYSTEM ZONE IDENTIFICATION APPARATUSES, SYSTEMS, AND METHODS

RELATED APPLICATION

The present application is a National Stage of International Application No. PCT/US2017/041198, filed Jul. 7, 2007, entitled INTELLIGENT LIGHTING CONTROL LIGHT SYSTEM ZONE IDENTIFICATION APPARATUSES, SYSTEMS AND METHODS, and claims priority to U.S. Provisional Patent Application No. 62/360,308, filed on Jul. 8, 2016, entitled "INTELLIGENT LIGHTING CONTROL LIGHT SYSTEM ZONE IDENTIFICATION APPARATUSES, SYSTEMS, AND METHODS," which application are incorporated herein by reference in their entirety.

TECHNICAL FIELD

The present application relates generally to the field of lighting control systems.

BACKGROUND

Customizing and automating home lighting control devices is often epitomized by the installation of unsightly lighting switches that are inundated with light switches confusingly mapped to respective fixtures. Automated home lighting control systems can also include large, complex, expensive central hubs that require expert or skilled technicians for installation and/or operation. Smart light bulbs and/or Wi-Fi enabled lightbulbs introduced into any of these contexts or even in simpler ones can disadvantageously be limited by the light switch that it is associated with and/or the lighting fixture itself. For example, if a light switch associated with a smart light bulb is switched off the smart light bulb becomes inoperable.

SUMMARY

The inventors have appreciated that various embodiments disclosed herein provide apparatuses, systems, and methods for detecting activities and conditions to intelligently control lighting control systems.

Various embodiments provide a method of operating a lighting control system. The method includes actuating a first switch control circuit of a first lighting control module of a plurality of lighting control modules. Each lighting control module in the plurality of lighting control modules includes a module housing, a graphical user interface coupled to the module housing, a light sensor coupled to the module housing, and a switch control circuit positioned in the housing. The switch control circuit includes a processor configured to modulate the flow of electrical energy to a lighting circuit via a dimmer circuit to produce a plurality of lighting scenes by varying the illumination of a light bulb connected to the lighting circuit. The switch control circuit is electrically connected to the graphical user interface and the light sensor. The method includes detecting actuation of the first switch control circuit of the first lighting control module at each lighting control module in the plurality of lighting control modules. The method includes polling the light sensor in each lighting control module by the respective processor in each lighting control module, to detect a change in a light level. The method includes transmitting, from each lighting control module, the change in the light level detected by the respective lighting control module. The method includes cataloging the lighting control modules that detected the change in the light level into a $1^{st}$ zone of one or more zones.

In some implementations, the method includes actuating the switch control circuit of each lighting control module in the plurality of lighting control module sequentially until each lighting control module in the plurality of lighting control module is catalogued into a respective zone.

In some implementations, the method includes cataloguing the lighting control modules that detected the change in light level into a respective zone based on a magnitude of the detected change.

In some implementations, the method includes modulating the flow of electrical energy to a respective lighting circuit based on a respective zone of the one or more zones.

Various embodiments provides a lighting control system. The lighting control system includes a plurality of lighting control modules communicably coupled to one another. Each lighting control module in the plurality of lighting control modules includes a module housing, a graphical user interface coupled to the module housing, a light sensor coupled to the module housing, and a switch control circuit positioned in the housing and including a processor configured to modulate the flow of electrical energy to a lighting circuit via a dimmer circuit to produce a plurality of lighting scenes by varying the illumination of a light bulb connected to the lighting circuit. The switch control circuit is electrically connected to the graphical user interface and the light sensor. A first switch control circuit of a first lighting control module in the plurality of lighting control modules is configured to initiate a first actuation to increase a flow of electrical energy to a first lighting circuit to cause illumination of a first light bulb connected to the first lighting circuit. Each processor is configured to detect an actuation of a first switch control circuit of a first lighting control module in the plurality of lighting control modules, poll the light sensor electrically connected to the respective processor to detect a change in a light level, in response to detecting actuation of the first switch control circuit, and transmit a signal indicating the change in the light level detected by the respective lighting control module, whereby at least one central processor catalogues the lighting control modules that detected the change in the light level into a 1st zone of one or more zones.

In some implementations the a second switch control circuit of a second lighting control module in the plurality of lighting control modules is configured to initiate a second actuation after polling the light sensor, in response to detecting actuation of the first switch control circuit.

In some implementations, the first lighting control module is configured to transmit an actuation signal to the other lighting control modules in response to actuation of the first switch control circuit to increase a flow of electrical energy to a first lighting circuit.

In some implementations, each lighting control module in the plurality of lighting control modules includes a wireless antenna system coupled to the respective processor.

Various implementations provide a computer program product for operating a lighting control system. The computer program product can include a non-transitory computer-readable storage medium coupled to one or more processors and having instructions stored thereon which, when executed by the one or more processors, cause the one or more processors to perform operations for operating a lighting control system apparatus according to anyone of the preceding implementations described and/or according to anyone of the apparatuses disclosed herein.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 2B and 2C illustrate multi-switch lighting control devices.

FIGS. 3A-3F illustrate a lighting control device transitioning through various lighting settings and a room having lighting fixtures controlled by the lighting control device.

FIGS. 9-12 provide schematics of example protocols initiated by the switches in order for the zone of each respective switch to be identified.

The features and advantages of the inventive subject matter disclosed herein will become more apparent from the detailed description set forth below when taken in conjunction with the drawings.

DETAILED DESCRIPTION

Following below are more detailed descriptions of various concepts related to, and exemplary embodiments of, inventive systems, methods and components of lighting control devices.

Figure 1A:
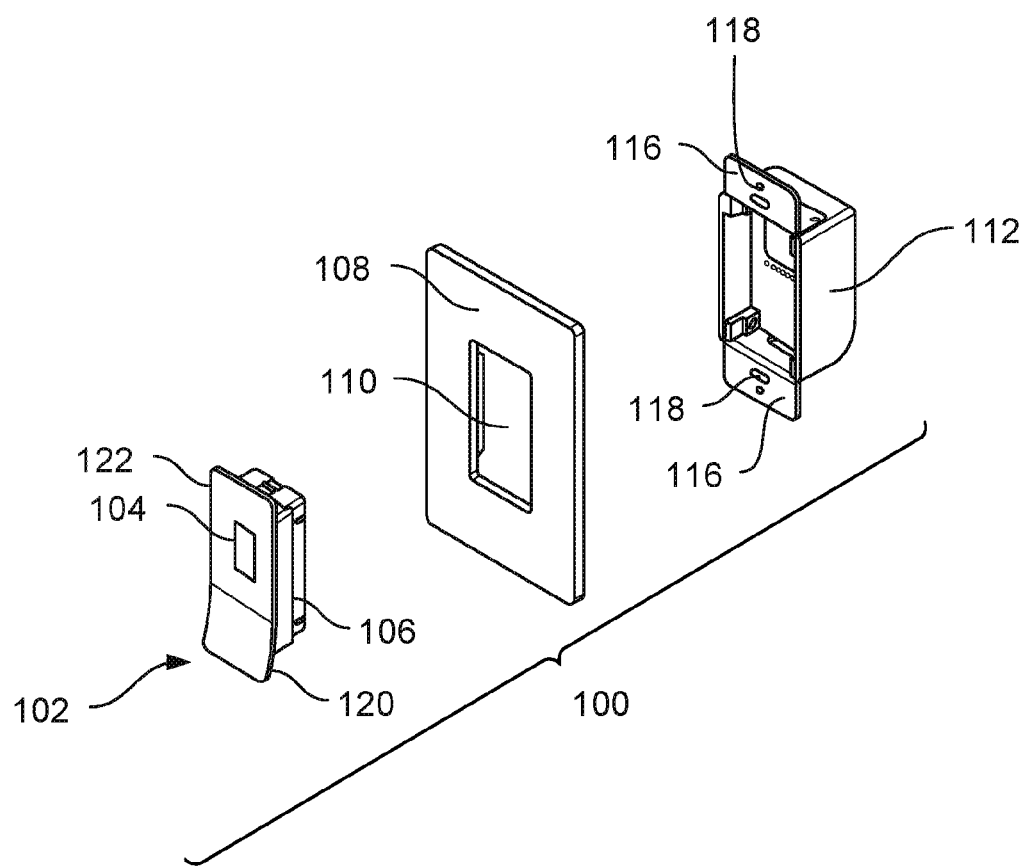
FIG. 1A is a perspective partially exploded view of a lighting control device.

FIG. 1A is a perspective partially exploded view of a lighting control device 100. The lighting control device 100 includes a switch module 102 including a light switch actuator 106 and a tactile display 104 housed in the light switch actuator 106. The lighting control device 100 also includes a wall plate cover 108 including a switch module opening 110 extending therethrough. The lighting control device 100 also includes a base module 112 configured for coupling to the switch module 102 via multi-pin socket 114.

The base module 112 is sized and configured for receipt within a one-gang wall electrical box and has a volume corresponding substantially thereto. The base module 112 is configured to be coupled to a wall electrical box via connection tabs 116 and fastener apertures 118 in the connection tabs 116.

The light switch actuator 106 includes an outer actuation surface 122, which as discussed further herein may be composed of glass. The actuation surface 122 is movable, for example, by pushing on the curved foot 120 to cause the light switch actuator 106 to pivot, for example. The pivoting of the light switch actuator 106 and the actuation surface 122 causes a contact component (shown in FIG. 2) of the switch actuator 106 to move from a first position to a second position. Movement of the contact component causes a connection of an electrical flow path, for example by allowing two electrical contacts to connect or by connecting the contact component with an electrical contact. The connecting of the electrical flow path, permits electrical energy supplied by a power source connected to the base module 112 to energize or activate the tactile display 104, as discussed in further detail herein. The tactile display 104 is structured in the switch module to move contemporaneously with at least a portion of the actuation surface 122 and with the actuator 106. When activated or energized, the tactile display 104 allows a user to define or select predefined lighting settings where the lighting settings change the voltage or power supplied to one or more light fixtures. The change in power supplied to the light fixtures may include a plurality of different voltages supplied to each fixture and may be based on various parameters including, but not limited to, location, light intensity, light color, type of bulb, type of light, ambient light levels, time of day, kind of activity, room temperature, noise level, energy costs, user proximity, user identity, or various other parameters which may be specified or detected. Furthermore, the lighting control device 100 may be connected to all of the lights in a room or even in a house and can be configured to operate cooperatively with one or more other lighting control devices 100 located in a unit or room and connected to the same or distinct lighting fixtures.

Figure 1B:
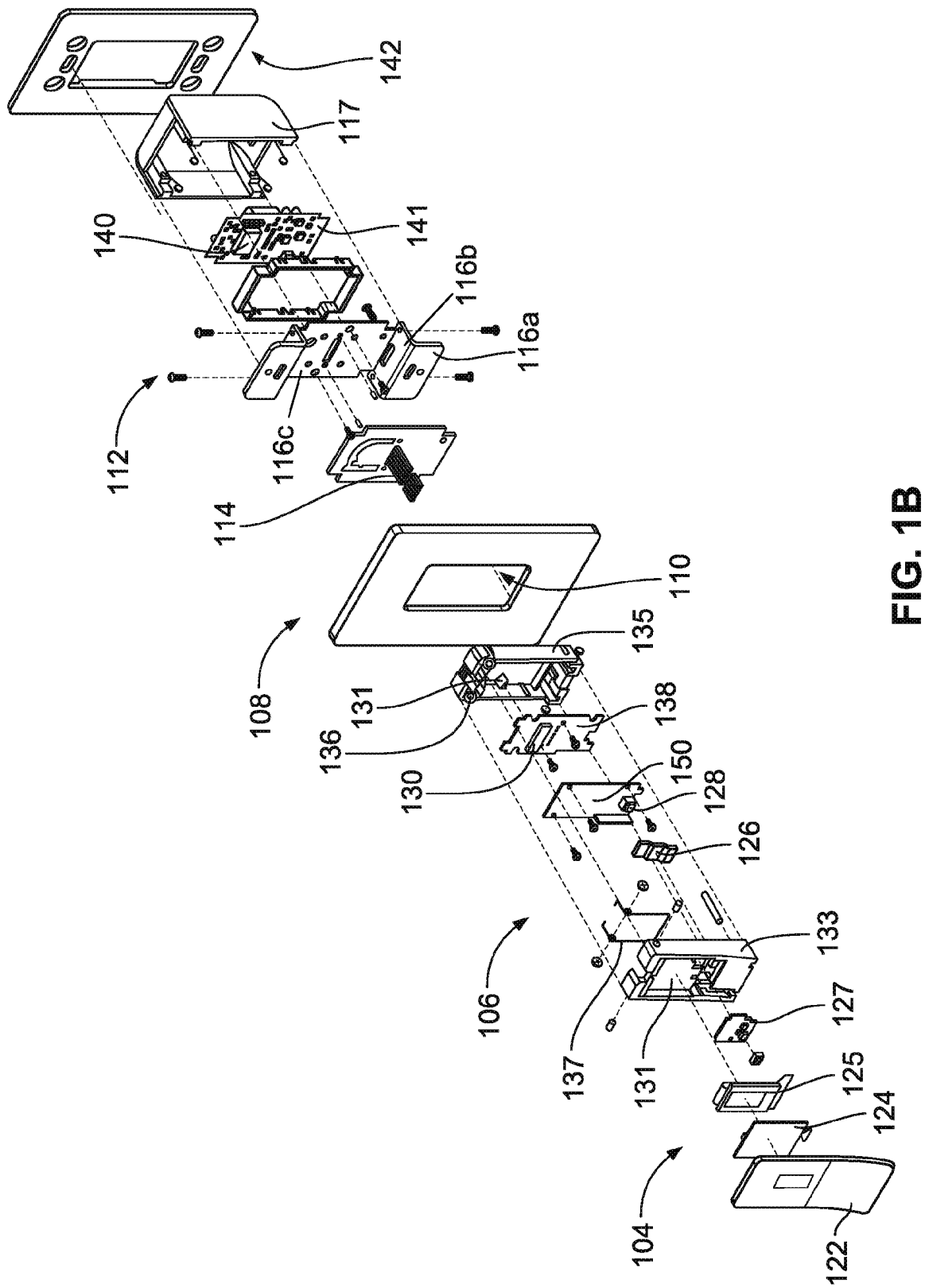
FIG. 1B is a fully exploded view of the lighting control device of FIG. 1A

FIG. 1B is a fully exploded view of the lighting control device 100 of FIG. 1A. As demonstrated in FIG. 1B, the tactile display 104 is positioned between the outer actuation surface 122 and the light switch actuator 106. The actuation surface 122 may be composed of an impact-resistant glass material permitting light from the tactile display 104 and/or a clear sight of path for sensors 127 or other lights, such as a light from light pipe 126 indicating activation to pass through the actuation surface 122. The tactile display 104 is composed of a polymer-based capacitive touch layer 124 and a light emitting diode panel 125, which are controlled via one or more modules or processors positioned on the printed circuit board 129. The tactile display 104 is housed within a recess 131 of the light switch actuator 106 beneath the actuation surface 122. The light switch actuator 106 may be formed as a thermoplastic housing including a housing cover 133 and a housing base 135. The light switch actuator housing cover 133 is pivotally connected to the housing base 135 via pins 136 and the housing cover 133 is biased with respect the housing base 135 via torsion spring 137. In particular embodiments, the light switch actuator housing cover 133 may be configured to slide or otherwise translate or rotate. The outer actuation surface 122 is biased with the switch actuator housing cover 133 and moves contemporaneously therewith in concert with the tactile display 104 housed in the cover component 133 of the light switch actuator 106. The light switch actuator 106 includes a switch pin 128 movable between positions to close an open circuit on the primary printed circuit board substrate 150, which board also houses a switch controller or processor. In certain embodiments the light switch actuator 106 may include a circuit board stack, including the primary printed circuit board substrate 150 and a secondary printed circuit board 138. The light switch actuator 106 may include a latch 136 for coupling to the base module 112 (e.g. as the light switch actuator 106 is passed through the opening 110 in the wall plate cover 108), which latch causes the light switch actuator 106 to click into place. The housing base 135 includes a multi-pin connector or plug 134 configured to engage the multi-pin socket 114 of the base module 112.

The lighting control device 100 includes a mounting chassis 142 configured to be installed to an electrical wall box. The mounting chassis 142 creates an even surface for installation of the other modules (e.g., the base module 112 and the switch module 102). Once the base module is connected to the electrical wall box via the mounting chassis 142, the wall plate cover 108 can be coupled to the mounting chassis 142 and the light switch actuator 106 can be inserted through the switch module opening 110. In particular embodiments, the wall plate cover can be coupled to the mounting chassis 142 and/or the tabs 116 of the base module via magnets. The magnets may be recessed within openings of a portion of the wall plate cover 108. As noted, the base module 112 is configured to be coupled to the mounting chassis 142 via connection tabs 116. The base module 112 is further configured to be electrically coupled to a power source (e.g., an electrical wire coming from an electrical breaker box to the electrical wall box) and to one or more light fixtures wired to the electrical box. Accordingly, the base module 112 provides an interface between a power source, the light switch actuator 106, and one or more light fixtures. The base module includes a processor 140 and a circuit board 141 for managing the power supplied by the power source and routed to the one or more light fixtures in accordance with a light setting selection identified via the light switch actuator 106 or the tactile display 104.

One or more of the processor on the printed circuit board 15038a or 138b 130 and the base module processor 140 may include wireless links for communication with one or more remote electronic device such as a mobile phone, a tablet, a laptop, another mobile computing devices, one or more other lighting control devices 100 or other electronic devices operating in a location. In certain implementations the wireless links permit communication with one or more devices including, but not limited to smart light bulbs, thermostats, garage door openers, door locks, remote controls, televisions, security systems, security cameras, smoke detectors, video game consoles, robotic systems, or other communication enabled sensing and/or actuation devices or appliances. The wireless links may include BLUETOOTH classes, Wi-Fi, Bluetooth-low-energy, also known as BLE, 802.15.4, Worldwide Interoperability for Microwave Access (WiMAX), an infrared channel or satellite band. The wireless links may also include any cellular network standards used to communicate among mobile devices, including, but not limited to, standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

Figure 2A:
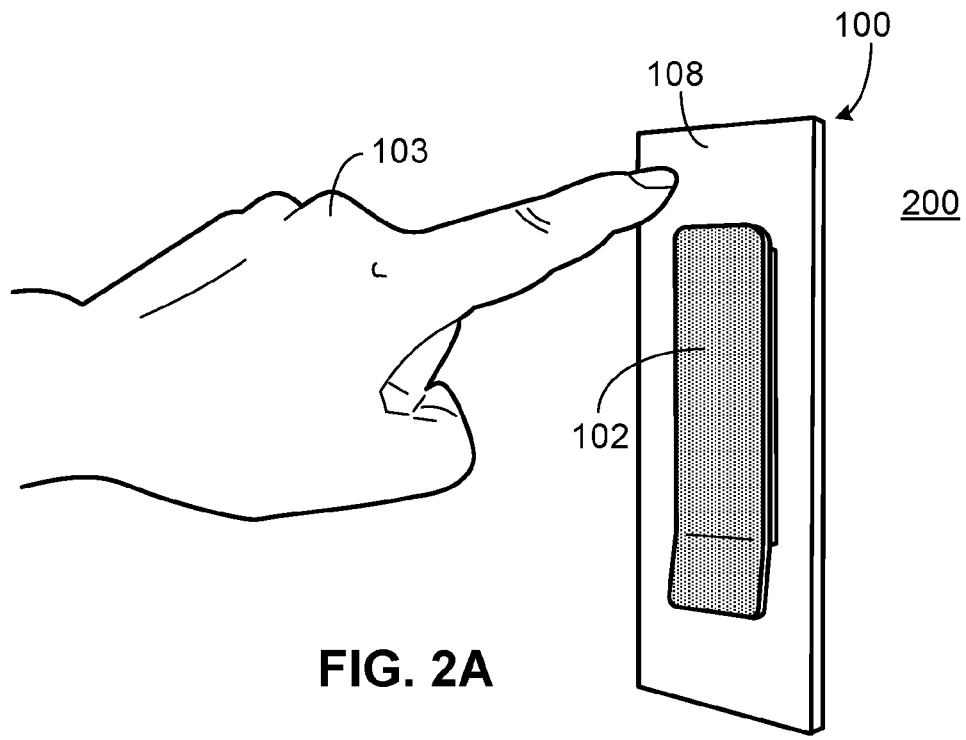
FIG. 2A shows the lighting control device of FIG. 1A mounted on a wall.

FIG. 2A shows the lighting control device 100 of FIG. 1A mounted on a wall 200. As demonstrated in FIG. 2A, the base module 112 is not visible upon installation of the lighting control device 100 in view of the wall plate cover 108. Because the wall plate cover 108 attaches to the base module 112, the wall plate cover 108 appears to be floating on the wall 200. The lighting control device 100 may be activated by a user 103 interacting with the outer actuation surface 122 and the tactile display 104.

Figure 2B:
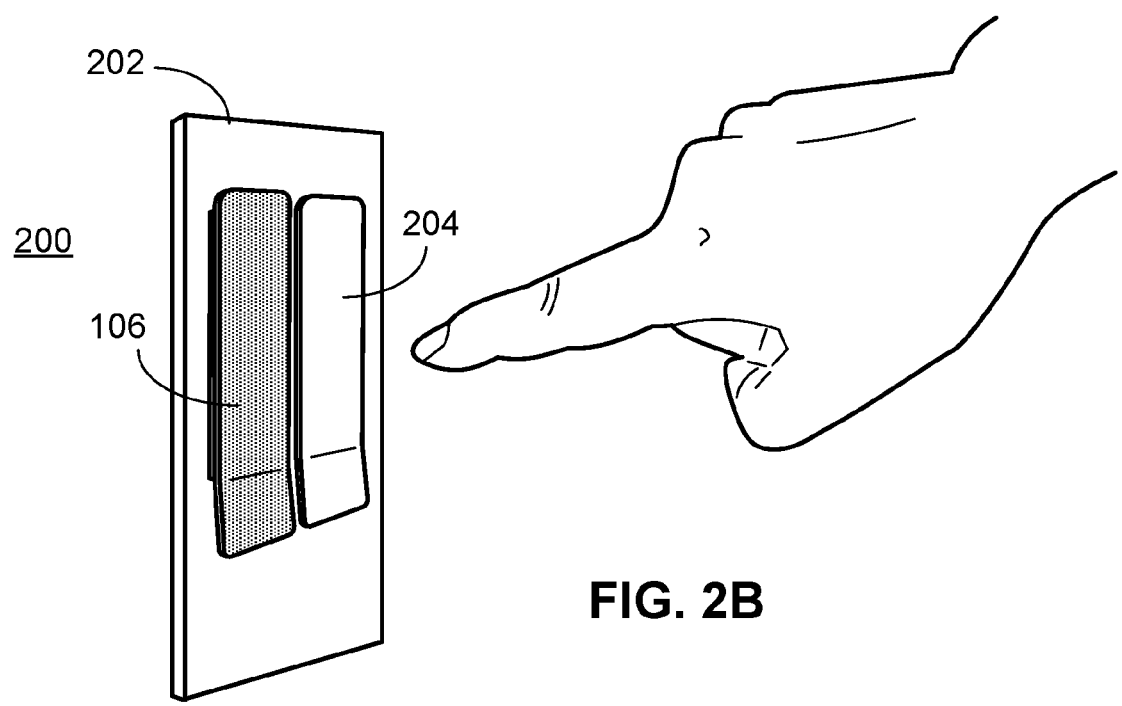

FIGS. 2B and 2C illustrate multi-switch configurations of multiple lighting control device. FIGS. 2B and 2C illustrate a two switch and three switch embodiment respectively where the lighting control devices 202 and 203 each include a light switch actuator 106 as well as auxiliary switches 204 and 208, as well as 2 and 3 base modules 112, respectively.

FIGS. 3A-3F illustrate a lighting control device transitioning through various lighting settings and a room having lighting fixtures controlled by the lighting control device.

Figure 3A:
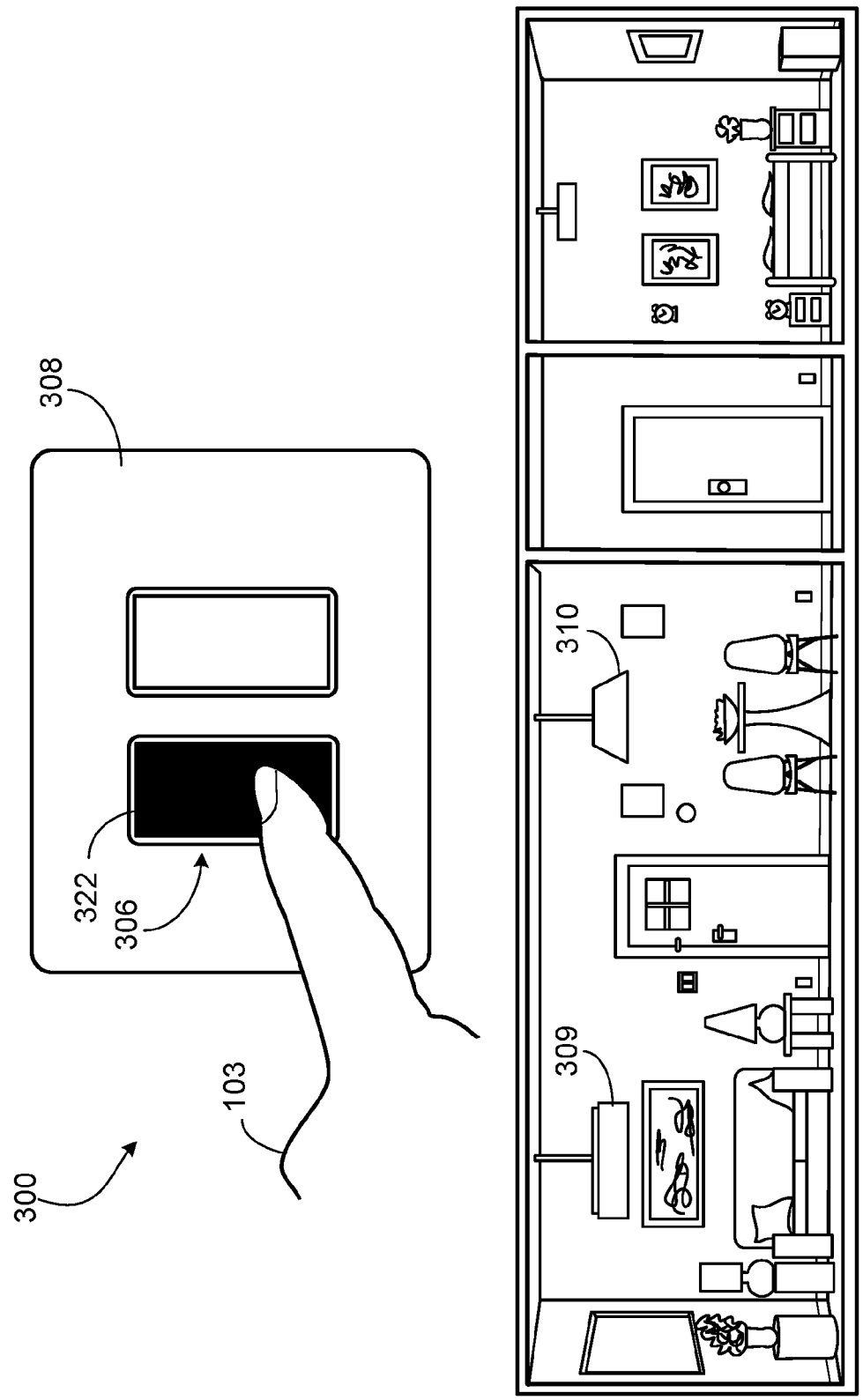
Figure 3B:
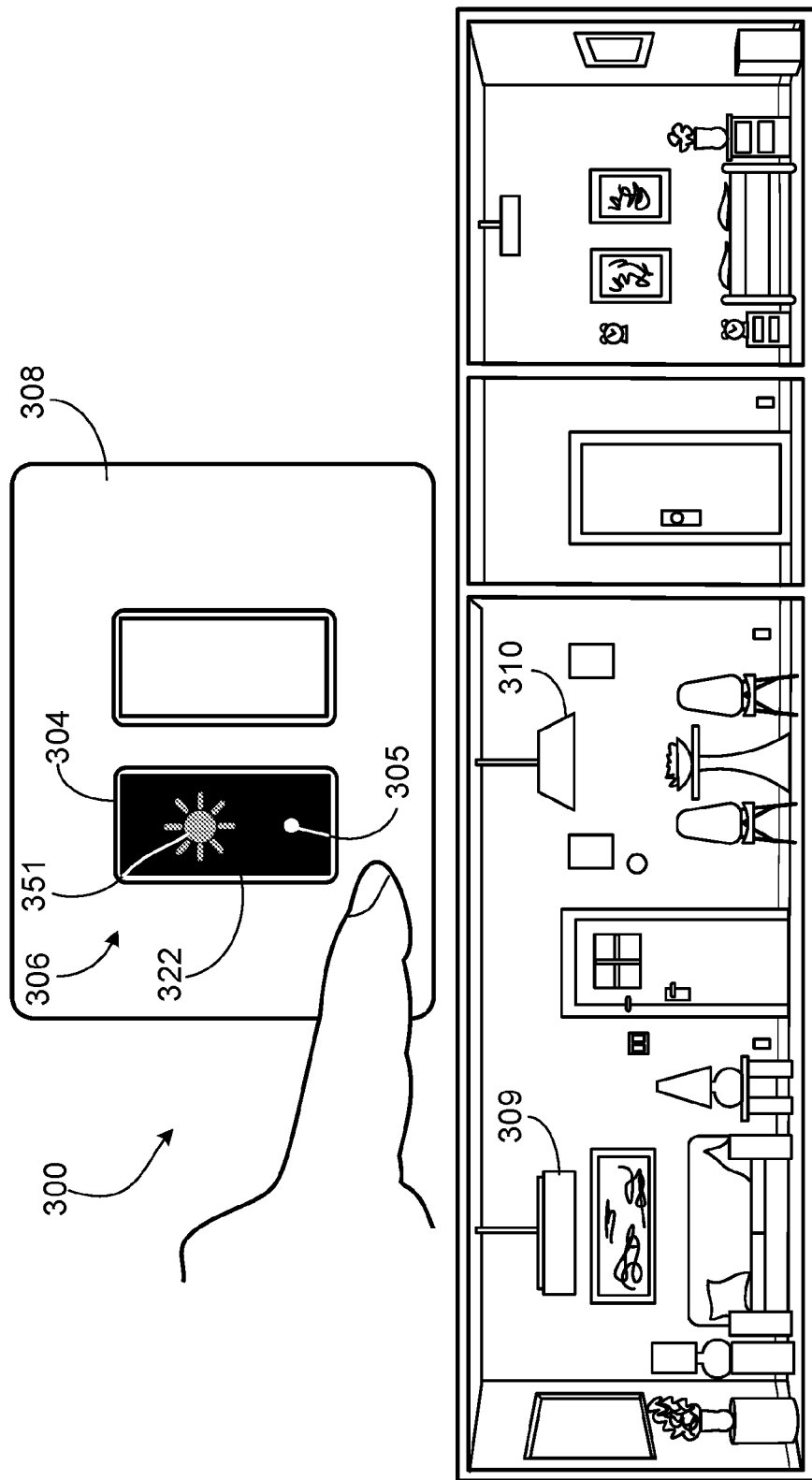
Figure 3C:
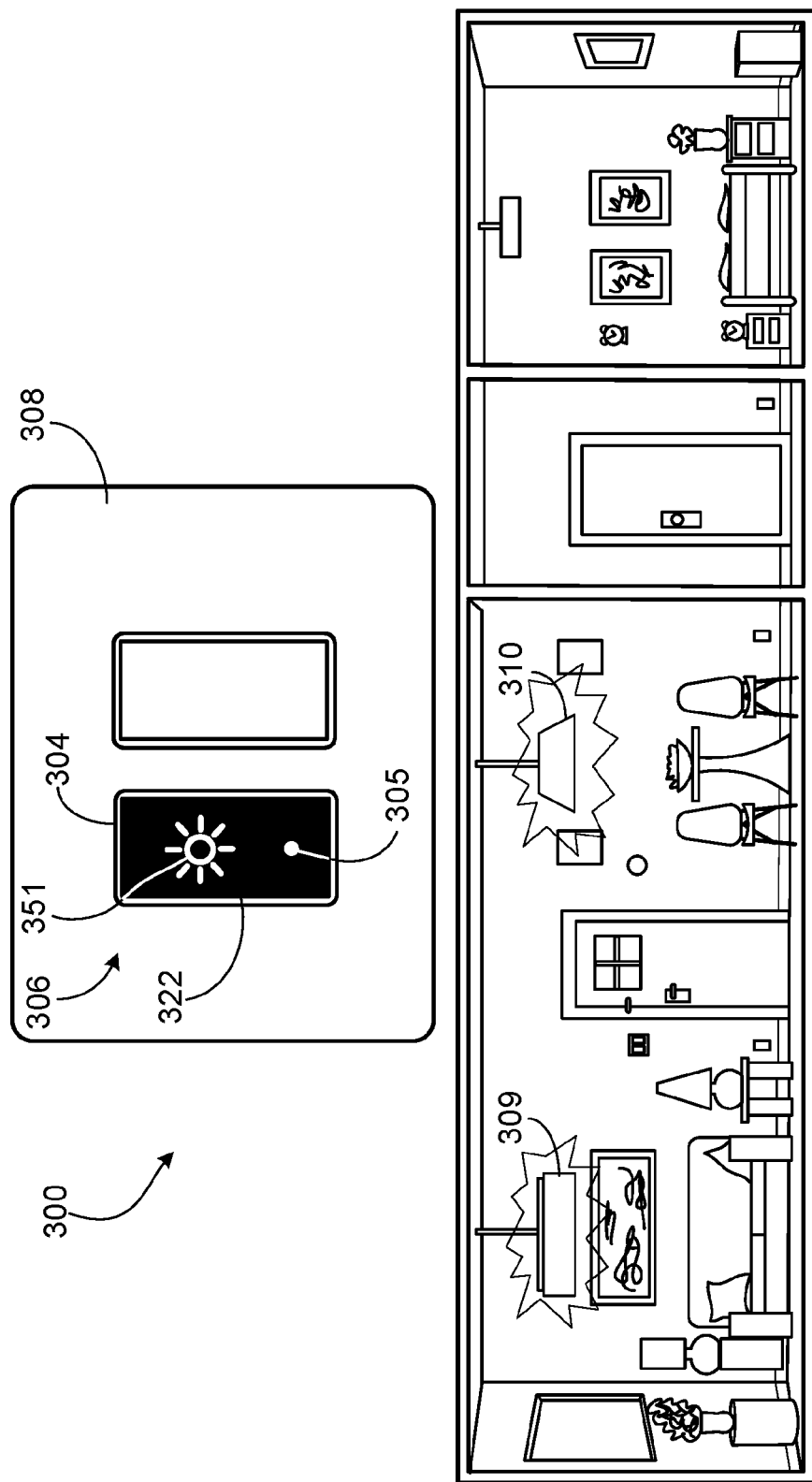
Figure 3D:
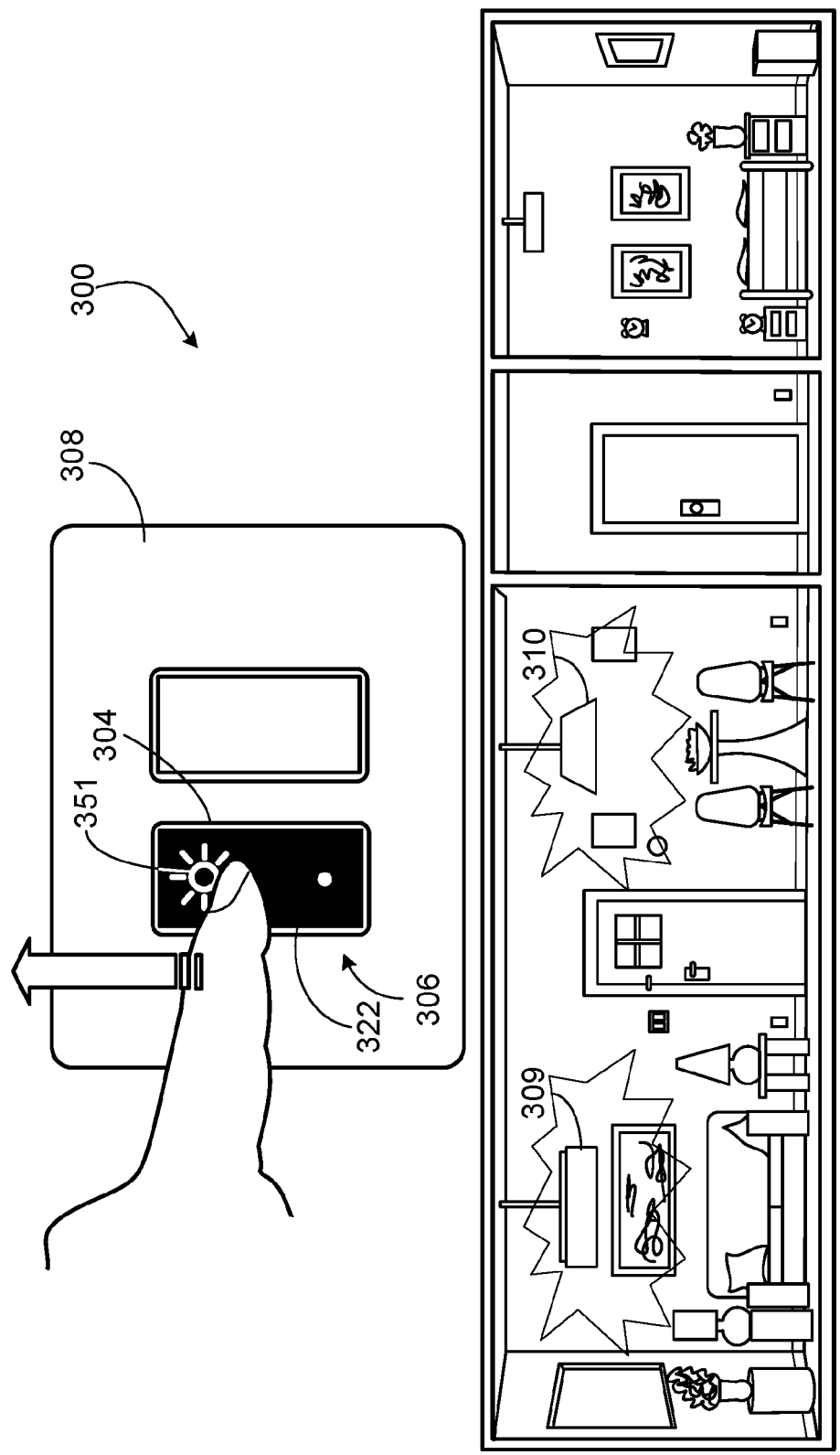
Figure 3E:
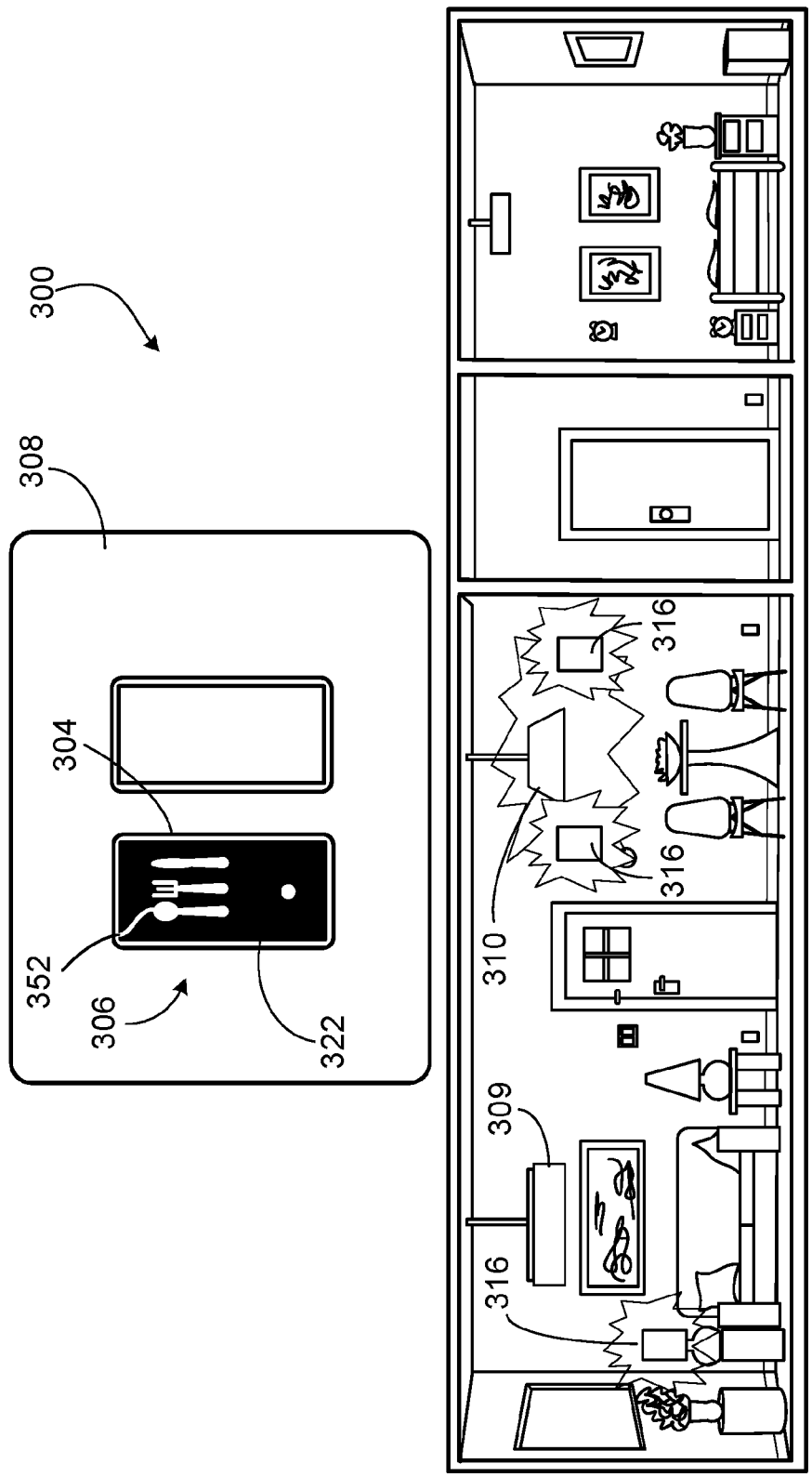

In FIG. 3A, the lighting control device 300 is connected to a base module positioned behind the wall plate 308. The lighting control device 300 includes a dynamic light switch actuator 306, operable in a manner similar to the light switch actuator discussed in connection with FIGS. 1A-2C, and an auxiliary light switch actuator. As demonstrated in FIG. 3A by the unilluminated outer actuation surface 322 of the light switch actuator 306 is inactive and not energized. In response to a user 103 moving the actuation surface 322 of the light switch actuator 306, the light switch actuator 306 begins to become energized, as shown in FIG. 3B. The energization or activation of the light switch actuator 306 is signaled by the power light indicator 305 and by full lighting setting icon 351. As shown in FIG. 3C where the icon 351 is fully lit (rather than partially lit as in FIG. 3B), the light switch actuator 306 is fully energized. In this particular configuration, the primary lights 309 and 310 are illuminated at full power. FIG. 3D shows the transition between lighting settings. As demonstrated in FIG. 3D, this transition is facilitated via user 103 completing swiping gesture 312 across the tactile display 304 and along the actuation surface 322. As the user completes the gesture 312, the icon 351 is swiped from the tactile display 304 as the tactile display toggles to a new light setting shown in FIG. 3E. The new light setting shown in FIG. 3E is represented or identified by the dinner icon 352. The new light setting shown in FIG. 3E has the light fixture 309 powered down and has caused lamp 316 and sconces 318 to become illuminated to change the lighting scene in the room. The change in the light setting causes a change in distribution of power to certain lighting fixture based on the selected lighting setting. The light switch actuator 306 may be pre-programmed with a plurality of lighting settings or may be configured with particular lighting settings as specified by the user 103. A further swiping gesture 315 shown in FIG. 3F or a different gesture are used to transition from the lighting setting of FIG. 3F represented by icon 352 to a further lighting setting.

Figure 4:
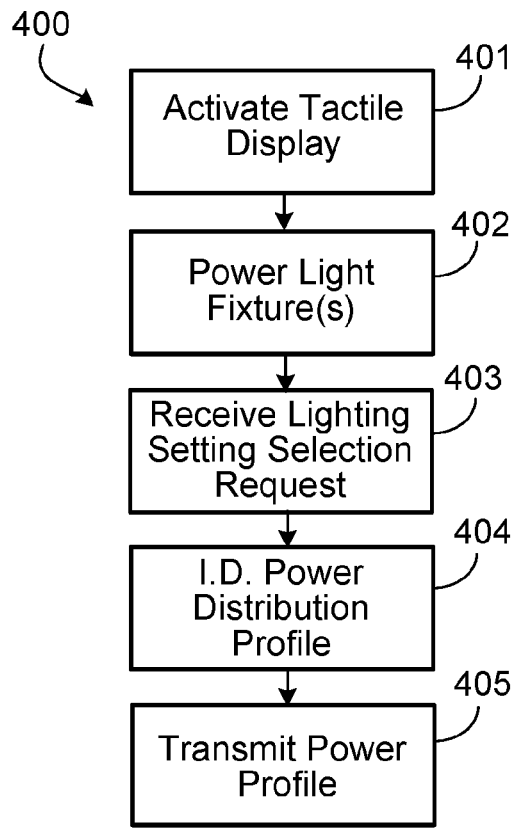
FIG. 4 provides a flow diagram of operations of a system for controlling a lighting control device.

FIG. 4 provides a flow diagram of operations of a system for controlling a lighting control device. FIG. 4 illustrates control operations of a control system, such as processor 130 configured to control the lighting control device 100 or 300, in accordance with various embodiments of the present invention. At 401, the tactile display housed in the light switch actuator is activated by moving the light switch actuator, for example by moving the actuation surface of the light switch actuator. At 402, the light fixtures electrically coupled to the light switch actuator via a base module are powered as the movement of the light switch actuator causes a contact component to move into a new position and thereby permit or cause an electrical flow path between a power source and the light fixture(s) to be closed. The tactile display housed in the light switch actuator is moved contemporaneously with the actuation surface. At 403, a lighting setting selection request is received via the tactile display, for example by a particular motion or motions on the tactile display. The lighting setting selection request identifies a lighting setting from among a plurality of lighting settings. A user may swipe multiple times to toggle through the plurality of lighting settings or may conduct a specific motion that corresponds to a particular lighting setting including, but not limited to, a half swipe and tap to achieve a light intensity of all the connected light fixtures at half of their peak output. The lighting settings identify distinct power distribution schemes for one or more light fixtures connected to the light switch module. At 404, a power distribution scheme is identified. At 405, the identified power distribution scheme is transmitted, for example by the base module responding to control signals from the light switch actuator, to adjust one, some, or all of the lights based on the power distribution scheme corresponding to the lighting setting selected. The power distribution schemes or profiles may be stored in a memory device of the lighting control device. In certain embodiments, the power distribution schemes may be adjusted to account for other parameters such as ambient lighting from natural light or an unconnected source. In certain embodiments the power distribution schemes may be adjusted based on one or more other sensor parameters. In particular embodiments, the lighting setting may be adjusted by automation based on time of day, sensed parameters such as light, temperature, noise, or activation of other devices including, but not limited to, any electronic device described herein.

Figure 5:
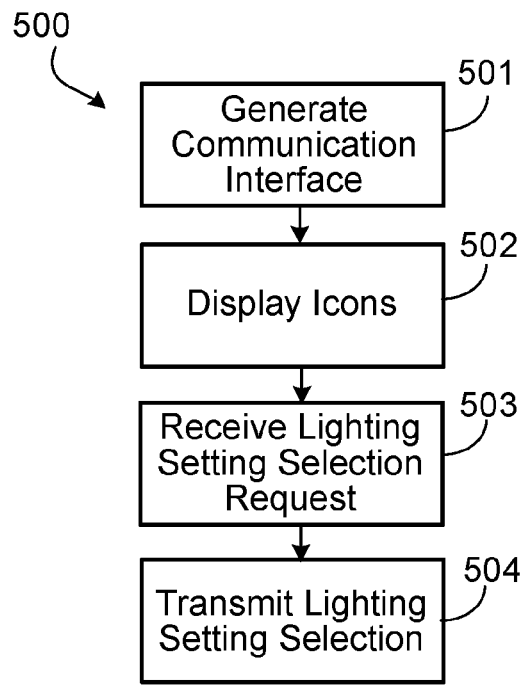
FIG. 5 shows a flow diagram of a system for remotely operating a lighting control device.

FIG. 5 shows a flow diagram of system for remotely operating a lighting control device. In particular embodiments, the lighting control device 100 or 300 may be operable from a remote device if the actuator switch is activated or energized. In such instances, the remote device may include one or more computer program applications, such as system 500, operating on the device to communicate with and control the lighting control device. Accordingly, at 501, the control system 500 initiates a connection module to generate a communication interface between a mobile electronic device and a light switch module. The connection module may cause the remote device to send one or more wireless transmission to the lighting control device via a communication protocol. At 502, the control system 500 causes the remote device to generate a display of icons on a display device of the mobile electronic device to facilitate selection of a lighting setting. At 503, the control system 500 receives a lighting setting selection based on the user selecting a particular icon. At 504, a transmission module causes the lighting setting selected to be transmitted to the lighting control device so that the light switch module and/or the base module can cause the power distribution scheme corresponding to the lighting setting to be transmitted to the lighting fixtures. The tactile display of the lighting control device may be updated in concert with receipt of the lighting setting to display the icon selected on the mobile electronic device and corresponding to the lighting setting selected on the tactile device.

Figure 6:
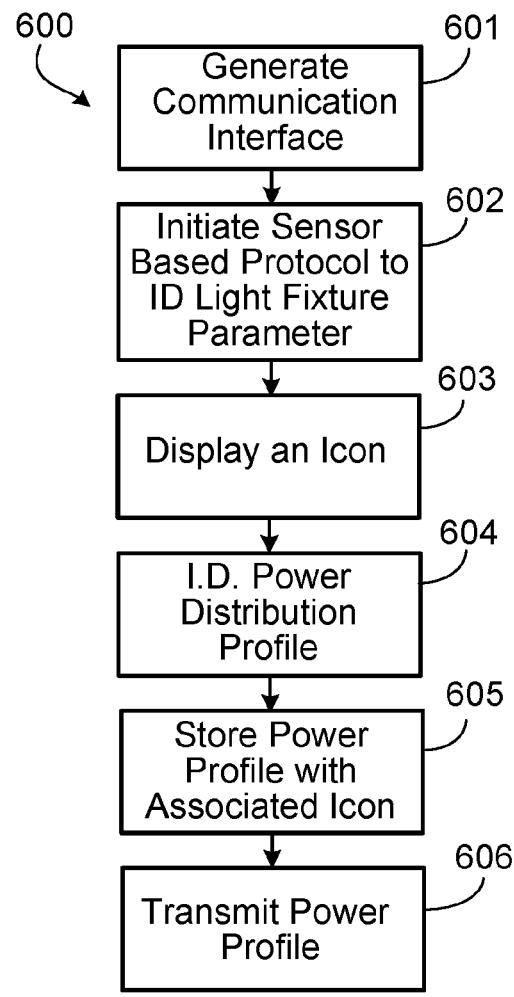
FIG. 6 illustrates a flow diagram of a system for remotely configuring operations of a lighting control device.

FIG. 6 illustrates a flow diagram of a system for remotely configuring operations of a lighting control device. The remote device may include devices including, but not limited to a mobile phone, a mobile computing device or a computing device remote from the light control device. At 601, the mobile electronic device generates a communication interface with the light switch module. At 602 a light fixture identification module initiates a sensor based protocol to identify a parameter associated with one or more light fixtures connected to the light switch control module. At 603, a display selection module causes a display of an icon to appear on a display device of the mobile electronic device. At 604, a lighting setting configuration module allows a user to create a power distribution scheme or profile for the light fixtures identified based on the identified parameters and a user specified input related to light intensity. At 604, a storage module is used to the store the power distribution scheme and associate a particular lighting setting icon with the power distribution scheme. At 605, a transmission module transmits the power distribution scheme and the associated icon to the light switch control module.

Figure 7:
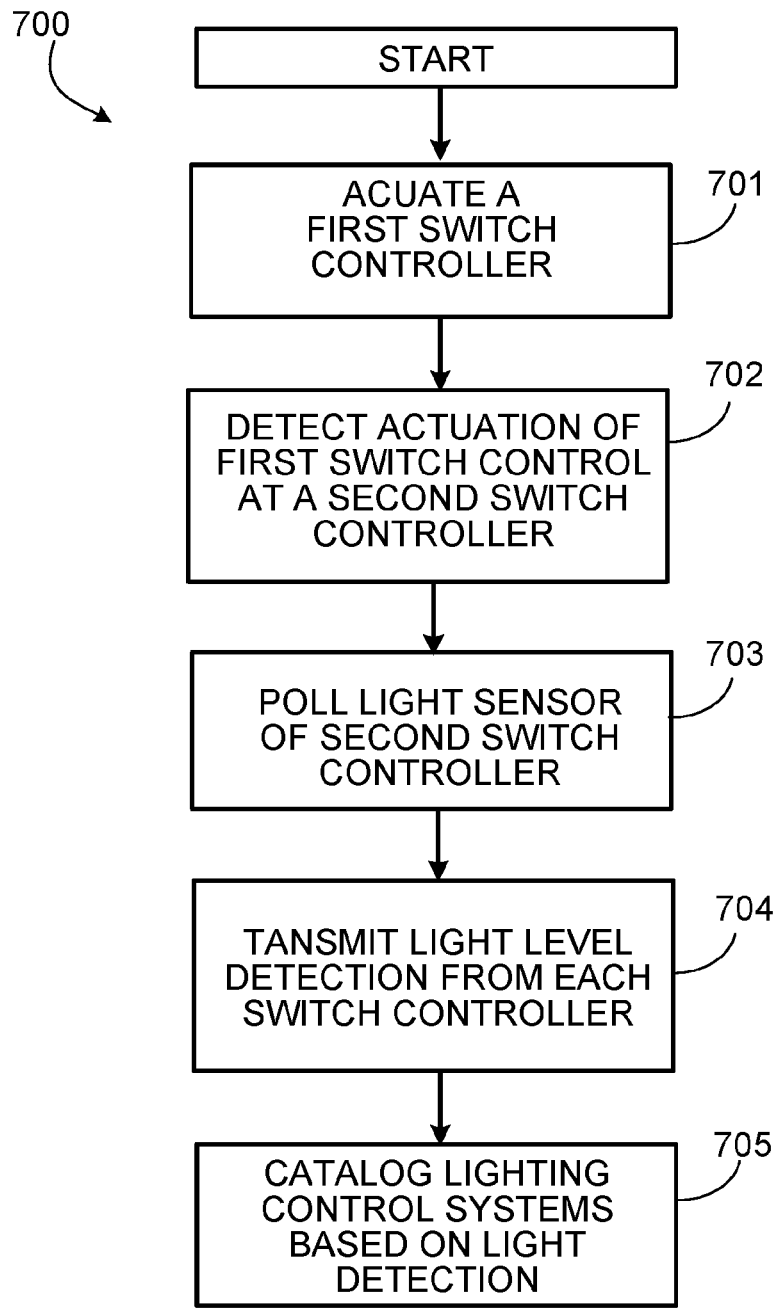
FIG. 7 is a flow diagram of a method of operating a lighting control system.

FIG. 7 is a flow diagram of a method of operating a lighting control system. At 701, a lighting control system, such as system 100, actuates a first switch controller of a first lighting control system communicably coupled to one or more other lighting control systems. At 702, the other(s) lighting control systems detect actuation of the first switch controller. At 702, the lighting control systems are polled for their light level detections detected based on actuation of the first switch controller. At 704, the detected level of light detection from each of the switch controllers (if any) is transmitted to a central controller. At 705, the central controller catalogues the switch controllers based on the light level detection.

Figure 8:
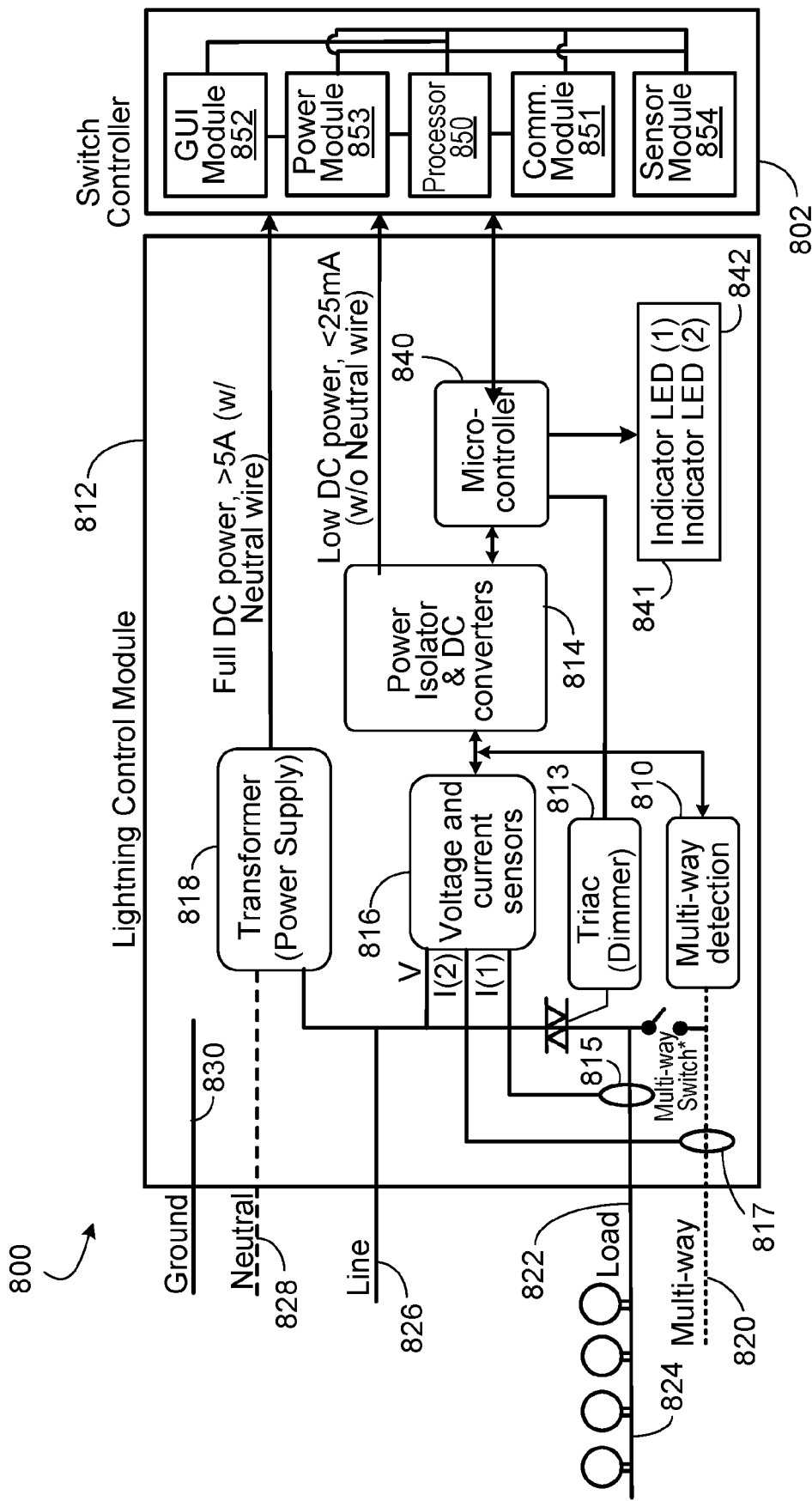
FIG. 8 is a schematic of a lighting control system.
Figure 10:
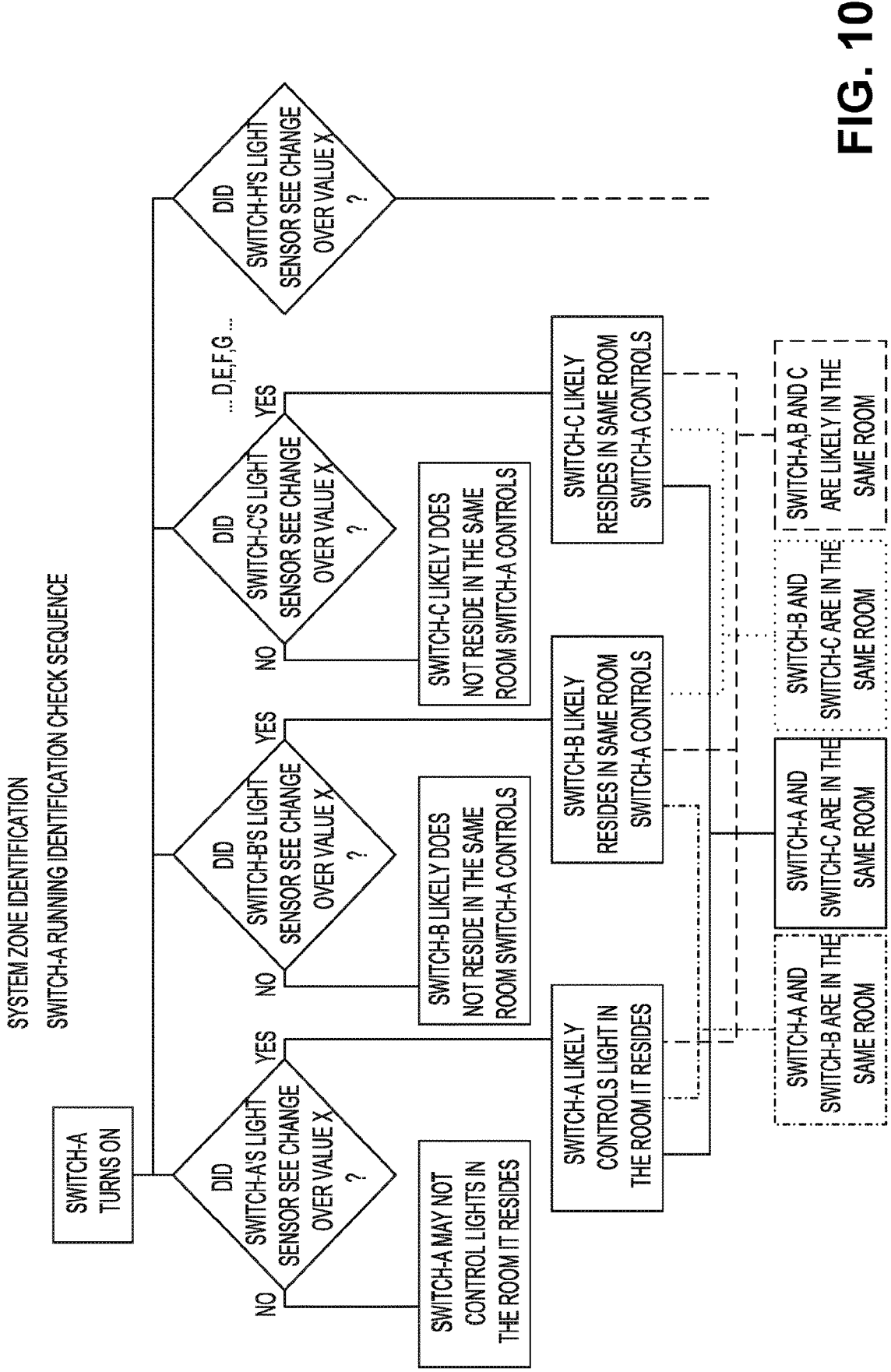
Figure 11:
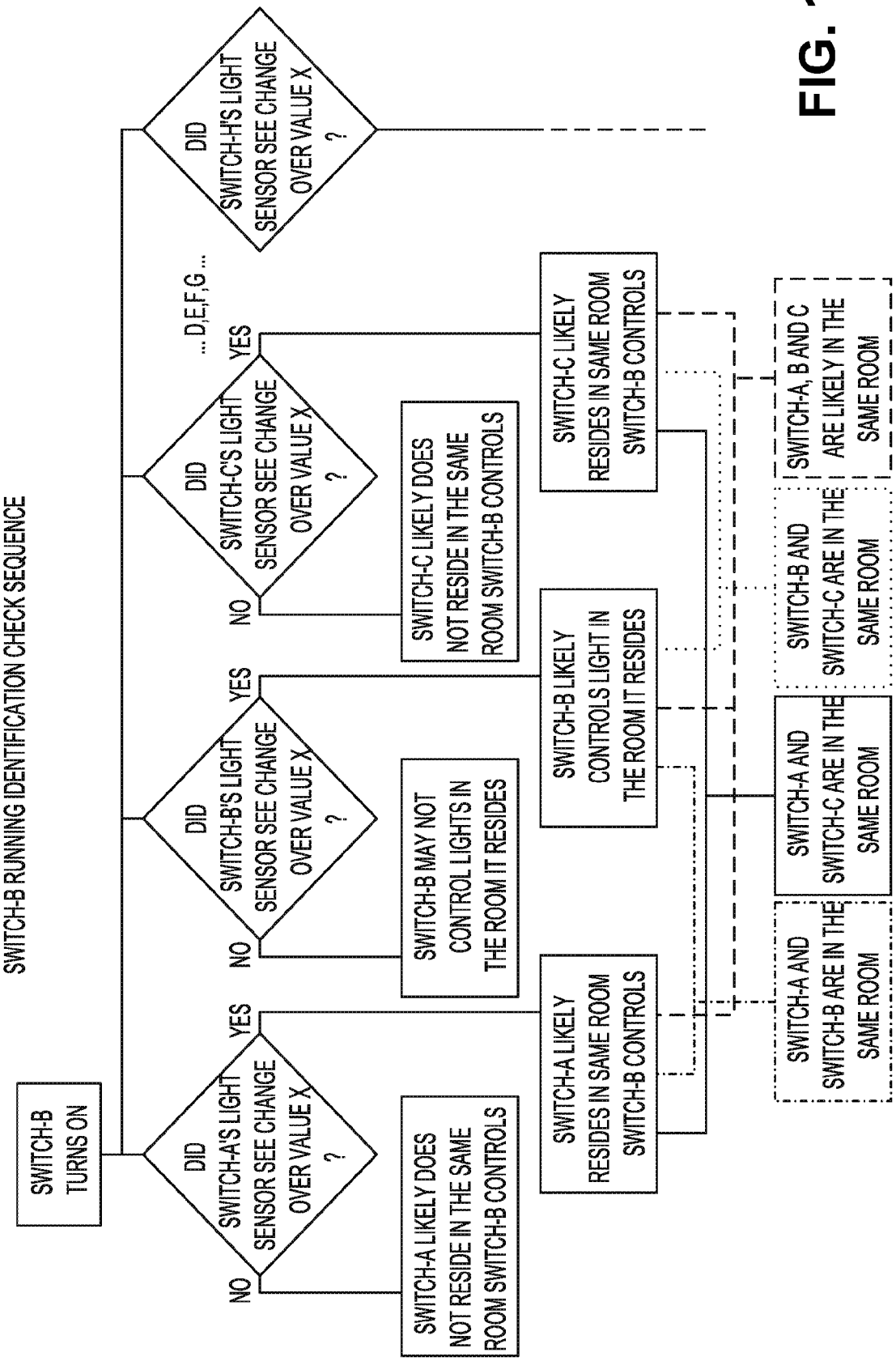
Figure 12:
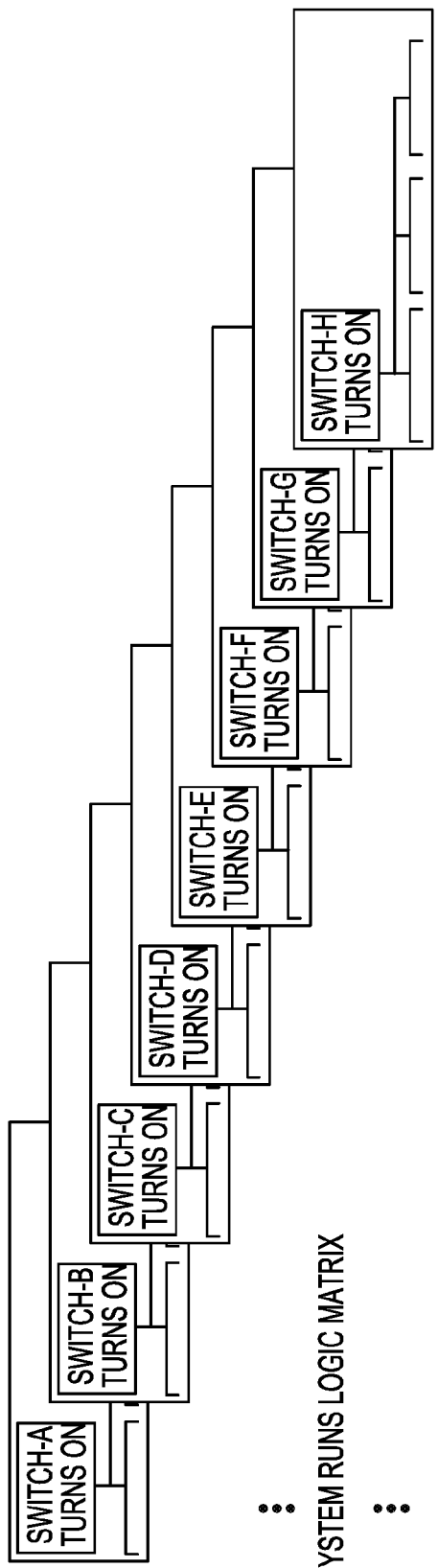

FIG. 8 is a schematics of a lighting control system 800 configured to execute lighting control operations described herein. The lighting control system 800 illustrates lighting control system components that can be implemented with a lighting control system including an air gap system as described herein. The lighting control system 800 is depicted separated into a base lighting control module 812 (which may be configured in a manner similar to base module 112) and a switch module or switch controller 802 (which may be configured in a manner similar to switch module 102). As described herein, the switch module 802 can include a tactile interface, operable via the graphical user interface module 852, and a switch actuator, such as the tactile display 104 and the light switch actuator 106 described herein. The switch module 802 houses a processor 850, which may be configured to send commands to microcontroller 840 and receive inputs from the micro-controller 840 to control the operation of a transformer 818, a power isolator and an AC to DC converter 814 (which may include a flyback converter), and a dimmer, such as a TRIAC dimmer 813, a voltage and current sensor 816. In some embodiments, the base lighting control module 812 may include a MOSFET dimmer. The power isolator 814 separates the analog AC current from the low power or DC digital components in the base lighting control module 812 and the switch module 802. The power isolate 814 may provide power inputs to the switch control module 802 via a power module 853. Power module 853 includes power circuitry configured to regulate the flow of power from the base module 812 to the switch controller module 802 including directing power to one or more of the modules in the switch controller module 802. The switch module 802 also houses a communication module, which can include one or more antennae or other wireless communication modules. The switch module 802 also houses a sensor module 854, which can include one or more sensors, such as a light sensor, a camera, a microphone, a thermometer, a humidity sensor, and an air quality sensor. The processor 850, is communicably coupled with one or more modules in the switch module 802 to control the operation of and receive inputs from those modules, for example to control modulation of the flow of electrical energy to a lighting circuit of a light fixture 824 connected to the base lighting control module 812.

The sensor module 854 can be configured to detect motion in a room. The sensor module can include one or more of passive sensors (e.g., passive infrared (PIR) sensor), active sensors (e.g., microwave (MW) sensor, ultrasonic sensors etc.) and hybrid sensors that include both passive and active sensor (e.g., Dual Technology Motion sensors). The passive sensors do not emit any energy and detect changes in energy of the surrounding. For example, a PIR sensor can detect infrared energy emitted by the human body (due to the temperature associated with the human body). Active sensors, on the other hand, emit electromagnetic or sonic pulses and detect the reflection thereof. For example, MW sensor emits a microwave pulse and detects its reflection. Hybrid sensors can include both active and passive sensors and therefore motion can be sensed both actively and passively (hybrid sensing). Hybrid sensing can have several advantages, for example, the probability of false positive detection of motion can be smaller in hybrid sensors compared to active/passive sensors.

The base lighting control module 812 includes a ground terminal 830 for grounding various electrical components container in the module 812. The base light control module 812 includes a neutral terminal 828 for connecting to a neutral wire, a line terminal 826, and a load terminal 822. As shown in FIG. 8, the voltage and current sensor(s) are coupled to the load line to detect changes in the voltage or current along the line carrying power to one or more light fixtures 824 connected to the lighting circuit (750). The base lighting control module 812 also includes a controller 840 communicably coupled to the processor 850. The base lighting control module 812 also includes LED indicator lights 842 and 841 for indicating information regarding the status of the base lighting control module 812. For example, in some embodiments LED indicator light 841 can indicates if a neutral wire is connected while LED indicator light 842 can indicate if a 3 way connection is connected.

FIGS. 9-12 provide schematics of example protocols initiated by the switches in order for the zone of each respective switch to be identified. As noted in FIG. 9, at an initial setup, each switch is unaware of its location relative to each other. The switches directly control particular groups of lights, but the groups of lights are not always in the same zone or location as the switch. For example a 3-way switch at the bottom of a staircase can control lights on the floor above it. An indoor switch can control an outdoor patio light. A hallway light can control the lights in an adjacent room. After running the zone identification sequence, the logic from the light sensor readings can reveal which lights are controlled by which switches. For example, if the switch's light sensors in the room observe identical measurements from two different switch activations, this indicates a 3-way configuration for the light in the room. Load measurements by each suspected 3-way switch (e.g. via current sensors) can confirm the light sensor data. Any lights that are not detected by the light sensor in any switch during the switching indicates that the lights activated are in an area or zone that is separate from the systems switch or out of a field of view of the switch. Accordingly, zones can be identified through the logic of the example check sequences shown in FIGS. 10-12. Once the zones are identified and each of the switch associated with particular zones determined, the zone switch mapping can be stored, for example in a server communicably coupled to one or more of the switches via a network such as the internet and can be depicted and controlled via one or more mobile electronic devices through the server.

Implementations of the subject matter and the operations described in this specification can be implemented by digital electronic circuitry, or via computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Implementations of the subject matter described in this specification can be implemented in a computing system that includes a back end component, e.g., as a data server, or that includes a middleware component, e.g., an application server, or that includes a front end component, e.g., a user computer having a graphical display or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary implementations, and that such variations are intended to be encompassed by the present disclosure. It is recognized that features of the disclosed implementations can be incorporated into other disclosed implementations.

While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way. Accordingly, implementations may be constructed in which acts are performed in an order different than illustrated, which may include performing some acts simultaneously, even though shown as sequential acts in illustrative implementations.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A lighting control system comprising:
   a plurality of lighting control modules communicably coupled to one another via wireless links, each lighting control module having
      a switch control circuit and a light sensor coupled to a processor, the switch control circuit configured to modulate a flow of electrical energy to a lighting circuit to produce a plurality of lighting scenes by varying an illumination of a light fixture connected to the lighting circuit,
      wherein the processor of at least one lighting control module is configured to,
      initiate actuation of the switch control circuit of a respective lighting control module;
      poll the light sensor of the respective lighting control module to measure a light level, in response to initiating the actuation of the switch control circuit; and
      determine a zone associated with the light fixture controlled by a group of the lighting control modules when the light level measurement is identical between at least two different switch control circuit actuations.

2. The lighting control system of claim 1, wherein the group of lighting control modules is arranged in a 3-way configuration.

3. The lighting control system of claim 1, wherein the processor of the at least one lighting control module is further configured to map the lighting control modules according to zones.

4. The lighting control system of claim 3, wherein the map of zones is stored at a server communicably coupled to the at least one lighting control module.

5. The lighting control system of claim 1, wherein the light level measurement is logged at each lighting control module and associated with the lighting control module whose switch control circuit actuation is initiated.

6. The lighting control system of claim 1, further comprising:
   a graphical user (GUI) interface included in the at least one lighting control module, wherein the processor of the at least one lighting control module is further configured to display the determined zone on the GUI.

7. The lighting control system of claim 1, wherein the processor of the at least one lighting control module is configured to determine the zone in response to an initial setup.

8. The lighting control system of claim 7, further comprising:
   a graphical user (GUI) interface included in the at least one lighting control module, wherein the GUI is used for the initial setup.

9. The lighting control system of claim 1, wherein each lighting control module is initially unaware of a relative location of a respective light control module to every other lighting control module.

10. The lighting control system of claim 1, wherein the wireless links use a Bluetooth protocol.

11. A lighting control system comprising:
    a plurality of lighting control modules communicably coupled to one another via wireless links, each lighting control module having
       a light sensor and a switch control circuit coupled to a processor, the switch control circuit configured to modulate a flow of electrical energy to a lighting circuit to produce a plurality of lighting scenes by varying an illumination of a light fixture connected to the lighting circuit,
       wherein the processor of at least one lighting control module is configured to,
       initiate actuation of the switch control circuit of a respective lighting control module;
       poll the light sensor of the respective lighting control module to measure a light level, in response to initiating the actuation of the switch control circuit; and
       determine a room in which a group of the lighting control modules is located when the light level measurement changes in response to the actuation of the switch control circuit.

12. The lighting control system of claim 11, wherein the processor of the at least one lighting control module is further configured to determine a zone associated with the light fixture controlled by a group of the lighting control modules when the light level measurement is identical between at least two different switch control circuit actuations.

13. A method to determine a zone associated with a light fixture controlled by a plurality of lighting control modules comprising:
    initiating actuation of a switch control circuit included in each of the plurality of lighting control modules;
    in response to initiating the actuation of the switch control circuit, poll a light sensor of a respective lighting control module to measure a light level; and
    determine the zone when the light level measurement is identical between at least two different switch control circuit actuations.

14. The method of claim 13, wherein a group of lighting control modules is arranged in a 3-way configuration.

15. The method of claim 13, further comprising mapping the lighting control modules according to zones.

16. The method of claim 15, further comprising storing the map of zones at a server communicably coupled to one or more of the lighting control modules.

17. The method of claim 13, further comprising:
logging the light level measurement; and
associating the logged light level measurement with the lighting control module whose light control circuit actuation is initiated.

18. The method of claim 13, further comprising:
displaying the determined zone on a graphical user interface (GUI) included in the respective lighting control module.

19. The method of claim 18, wherein the determination of the zone is in response to an initial setup using the GUI.

20. The method of claim 13, wherein each lighting control module is initially unaware of a relative location of the respective light control module to every other lighting control module.

* * * * *